United States Patent [19]

Carson

[11] Patent Number: 5,015,142

[45] Date of Patent: May 14, 1991

[54] SYSTEM FOR MECHANIZED PICKUP OF SEPARATED MATERIALS

[76] Inventor: William S. Carson, 3524 Twisted Oak Ct., Lake Wales, Fla. 33853

[21] Appl. No.: 457,299

[22] Filed: Dec. 26, 1989

[51] Int. Cl.⁵ .......................... B60P 1/30; B65B 21/02

[52] U.S. Cl. .................................... 414/408; 414/409; 414/411; 414/555; 220/553; 220/909

[58] Field of Search ............... 414/406, 408, 409, 411, 414/419, 420, 421, 546, 555, 549, 541, 542, 544; 220/1 T, 20, 22, 23.2, 23.4, 23.83, 324

[56] References Cited

U.S. PATENT DOCUMENTS

| | | | |
|---|---|---|---|
| 3,011,666 | 12/1961 | Dempster et al. | 414/411 X |
| 3,211,312 | 10/1965 | Miller | 298/8 R |
| 3,687,317 | 8/1972 | Gagel | 414/411 |
| 3,721,355 | 3/1973 | Irving | 414/549 |
| 3,765,554 | 10/1973 | Morrison | 414/555 X |
| 3,823,972 | 7/1974 | Ramer | 414/406 X |
| 3,893,615 | 7/1975 | Johnson | 220/20 X |
| 3,896,946 | 7/1975 | Forsyth et al. | 414/544 |
| 4,113,125 | 9/1978 | Schiller | 414/406 |
| 4,175,903 | 11/1979 | Carson | 220/324 X |
| 4,182,530 | 1/1980 | Hodge | 220/1 T |
| 4,239,437 | 12/1980 | Naab | 414/411 X |
| 4,290,352 | 9/1981 | Schmidt et al. | 414/406 X |
| 4,585,139 | 4/1986 | Bronson et al. | 220/1 T X |
| 4,660,758 | 4/1987 | Tavel et al. | 232/43.2 |
| 4,690,609 | 9/1987 | Brown | 414/544 X |
| 4,722,658 | 2/1988 | Wurtz et al. | 414/408 |
| 4,801,034 | 1/1989 | Sandomeno | 220/23 X |
| 4,821,903 | 4/1989 | Hayes | 220/23.4 X |
| 4,828,592 | 11/1989 | Lee | 220/23.83 |
| 4,834,253 | 5/1989 | Crine | 220/23.4 X |
| 4,854,406 | 8/1989 | Appleton et al. | 414/406 X |
| 4,863,053 | 9/1989 | Oberg | 414/411 X |
| 4,915,570 | 4/1990 | Rath et al. | 414/409 |

FOREIGN PATENT DOCUMENTS

| | | | |
|---|---|---|---|
| 3332059 | 3/1985 | Fed. Rep. of Germany | 414/408 |
| 3600603 | 9/1986 | Fed. Rep. of Germany | 220/1 T |
| 3531554 | 3/1987 | Fed. Rep. of Germany | 220/1 T |
| 3542252 | 5/1987 | Fed. Rep. of Germany | 220/1 T |
| 3542254 | 7/1987 | Fed. Rep. of Germany | 414/406 |
| 3636310 | 4/1988 | Fed. Rep. of Germany | 220/1 T |
| 2576852 | 8/1986 | France | 414/409 |
| 2091208 | 7/1982 | United Kingdom | 414/555 |

*Primary Examiner*—Robert J. Spar
*Assistant Examiner*—Robert S. Katz
*Attorney, Agent, or Firm*—Macdonald J. Wiggins

[57] ABSTRACT

A system includes a point-of-use container having a plurality of removable bins with each bin for a different recyclable material. A pickup container, transportable to a pickup location, has a plurality of bins corresponding to the point-of-use bins, each bin having a hinged lid with a catch for maintaining the lid normally closed. A truck body has a set of bins corresponding to the pickup container bins and an automated arm mechanism for picking up and inverting the pickup container over the truck body bins. A computer is programmed to control the arm mechanism to perform the required movements. A barcode on the pickup container is read and lid catch releases selectively operated when each bin is over a corresponding truck body bin to dump the contents of the container bins. The container is returned to its pickup location and released.

10 Claims, 6 Drawing Sheets

SYSTEM FOR MECHANIZED PICKUP OF SEPARATED MATERIALS

BACKGROUND OF THE INVENTION

1. Field of the Invention

The present invention relates to a refuse recycling separation and collection system for garbage, trash, and the like, and more particularly to a system for mechanically picking up and dumping separated materials.

2. Description of the Prior Art

In the past few years, a number of trash pickup trucks and containers have been developed which permit pickup of trash by a trash truck operated by one person. For example, in my Patent No. 4,175,903 I disclose such an apparatus and a container especially designed to facilitate the lifting of the container and the dumping of its contents. Similar apparatus has been disclosed in the following U.S. Pat. No. 2,933,210; U.S. Pat. No. 4,726,726; U.S. Pat. No. 4,543,028; U.S. Pat. No. 4,722,658; and U.S. Pat. No. 4,669,940. In more recent years, many communities have begun to require separation of garbage and trash into several groups, for example, cans, bottles, and paper. Such materials are required to be carried to curbside in separate containers and manually dumped into trash trucks having separate compartments for each type of separated material. The purpose is to be able to reclaim a large portion of such materials to thus minimize the trash disposal problem as well as to conserve national resources. To comply with these requirements, truck manufacturers have provided multiple compartment trucks. However, each separate container must be picked up and dumped by hand into the appropriate section of the truck. One example is the General Engines Company, Inc. of Thorofare, N.J. that provides a multi-compartmented dump truck body which can be unloaded in a manner such that each compartment is dumped separately.

There is no known system in which the collection and dumping of the materials from a divided container into separate compartments on the truck can be accomplished mechanically. Known collection systems require two or more persons to expedite pickup. Furthermore, the householder has the problem of keeping several separate containers in the home and delivering the same to several outdoor containers. This is, of course, an inconvenience, requires time and labor, and discourages recycling. Thus, there is a need for a mechanized pickup system which will reduce the labor and costs of separating and collecting materials for convenience and encouragement of recycling.

SUMMARY OF THE INVENTION

The mechanized trash pickup system of the invention comprises three distinct elements. The first element is an indoor container for use by the householder which permits several separate, open-topped plastic containers or bins to be held therein, in which the bins can be easily removed for transport and dumping of the contents thereof. For purposes of disclosure, I will refer to three such bins although it is to be understood that more or less than three may be utilized. A lid is provided having spring loaded hinges and a catch lever which permits easy access to the inner containers. Each bin is identified in accordance with the material to be deposited therein, such as cans, bottles, and paper. For example, each bin may be molded from a different color plastic to represent the material it is to contain. In use, a person opens the cover and deposits material, for example, a can in the bin designated therefor. When it is desired to put the material outside for pickup, the user lifts out that bin by a handle and carries it to a second element of the system, namely, an outdoor container having three bins and which will be mechanically picked up by a third element of my invention, a compartmented truck having mechanized pickup capability. The contents of the outdoor container are selectivity deposited in the truck compartments. Selectively deposited in the truck.

After dumping of the contents of an inside bin in the proper outdoor container bin, the inside bin is returned and placed back in the indoor container. As will be recognized, some materials may require more frequent dumping more often than others.

The outdoor container may be a rectangular cart-like device having a tubular framework. A handle is provided at one end and a set of wheels to permit easy movement. A stand is attached at a forward end to maintain the container essentially level. The tubular framework is lined with thin sheet metal or plastic and divided into three bins, one for each of the materials as previously mentioned. A sheet metal or plastic cover is provided for each bin. Each cover is hinged along one edge of its bin. Each cover or lid includes a spring loaded catch along an upper edge of the container framework which maintains the bin normally closed. The catch includes a release actuator rod which extends down to a lower longitudinal frame member and pivoted thereat. As will be explained below, the catch will be released during dumping of an individual container bin into the truck. The end of the framework opposite the handle includes an identification plate attached to the upper lateral tubular member thereof which includes indicia indicative of the contents of each of the bins of the container. For example, the plate may be labeled "paper", "cans", "glass", or the initials thereof from left to right indicating the material deposited in each bin. Similarly, a label may be placed on each lid indicating the contents. In addition to such indicia, in one aspect of my invention I utilize a bar code for each bin marked on the plate.

Another part of the second element of the system is a clamping arm assembly having a pair of horizontally extending clamp arms attached to a framework and a pair of hydraulic linear actuators which move the two arms laterally inward or outward. The inside surface of each of the arms may be covered with a pad molded of resilient material having a plurality of inwardly projecting cone shaped projections as described in my U.S. Pat. No. 4,175,903.

As will be described below, the clamping arm assembly is attached to and positioned by an articulated pickup arm. To pick up the outside container, the arms are opened laterally and extended along the longitudinal sides of the outside container. A bar code reader is attached to the clamping arm assembly in a position to contact and read the identification plate on the front of the outside container. As the arms are extended to the point that the bar code reader contacts the identification plate, the longitudinal extension stops and the hydraulic actuators move the arms inward to contact the tubular framework. As will be understood and as described in some detail in my U.S. Pat. No. 4,175,903, the resilient cones grip the container framework securely. The clamping arms includes a plurality of hydraulic actuators that operate a set of catch release members such that each can operate a lid catch release to release a lid at an appropriate time.

The third element of the invention is a truck body and a pickup arm assembly. The truck body in this example is a standard box-type having dividers to divide the body into three collection bins corresponding to the three materials to be collected. A longitudinal track is mounted to one side of the body and a carriage provided which rides on the track. The carriage is attached to a chain drive running the length of the truck body and driven by a hydraulic motor. The carriage supports a pair of articulated arms projecting at right angles from the truck body and having an elbow joint between the arms and a second elbow-type joint at the distal end thereof. The proximal end of the articulated pickup arm is operated by a hydraulic rotary actuator on the carriage. The distal section of the articulated arm is connected at the elbow by a hydraulic rotary actuator and the elbow joint at the distal end is similarly operated by a hydraulic rotary actuator. Thus, the jointed arm can move in a manner to maintain the clamping arm assembly with the clamping arms parallel to the ground.

Assuming that an outside container is at the curb and is to be picked up and dumped, the articulated arm is extended outward and downward to place the clamping arm assembly in its open position at the front end of the container. At that point, the clamping arm assembly is extended outward horizontally until the bar code reader contacts and reads the barcodes at the front end of the outside container. The forward movement of the articulated arms cease and the clamping arms are moved laterally inward until they clamp the framework of the outside container. Next, the articulated arms are operated to raise the clamped container upward and inverting the container over the truck body. The carriage is then operated to move clamped container over the bin for the material to be dumped. The hydraulic actuator for the bin of the material to be dumped is operated, releasing the lid lock catch. The lid will fall open by gravity and the contents of the bin will fall into the truck compartment.

The carriage is then operated to move the arm assembly to the next truck bin, and the lid catch for that container bin is released to dump the contents in the matching truck bin. This operation is repeated for the third bin. At that point, dumping is complete, the arm assembly returns the container to the ground and the clamping arms are released. The pickup arm assembly is then retracted to a folded travel position over the truck body for movement to the next pickup point.

The operation just described may be performed manually by personnel having manual controls. However, I prefer to operate the system automatically. To that end, I provide a computer preprogrammed to perform the various functions in the proper sequence with signals from an operator as to when to begin sequences or to interrupt sequences. The computer is controlled by signals from the bar code reader to indicate the contents of each bin of the outdoor container being picked up. Preferably, the contents will be dumped sequentially from the front truck bin toward the rear truck bin to minimize time. After a pickup is complete, the folded pickup arm is positioned over the front bin for travel. The operator can observe the container pickup phase and make any manual corrections that may be required.

When the computer program receives an indication that an outdoor container has been clamped by the clamping arms, it initiates the pick up procedure. The preprogrammed articulated arm movements then are carried out in sequence. At the time the outdoor container is over a truck bin matching the container bin contents, the computer signals for operation of the release actuator for that material. After a delay to permit complete dumping, the computer causes the carriage to move to the next bin and the operation is repeated.

After all of the bins have been dumped, the computer controls the arm to deposit the outside container back on the ground and release and to cause the arm to fold up for transport.

As will now be recognized, I have described a system which will permit one person to drive a trash pickup truck and initiate an automatic sequence to pick up a curbside container and dump each section thereof into the corresponding truck bins for materials contained therein. The entire operation can be performed very quickly and with no damage to the outdoor container as may occur in prior art systems.

It is therefore a principal object of my invention to provide a mechanical, computer controlled trash pickup system which provides a householder with means for easily sorting trash and transferring to a compartmented curbside pickup container, and a trash truck body having means for picking up the container and selectively dumping separated trash into matching bins in the truck body.

It is another object of my invention to provide a point-of-use trash container having a plurality of separate bins for sorted trash, in which the bins are easily removable and transportable for dumping in to an outside container.

It is yet another object of my invention to provide an outside container having bins matching the point-of-use bins for receiving separated trash therefrom and which is formed to be picked up mechanically.

It is still another object of the invention to provide a pair of clamping arms for clamping the outside container and for selectively opening lids of the container.

It is another object of the invention to provide a truck body having a set of controllable arms connected to the clamping arms, a proximal end of the arms supported by a carriage adapted to move along a longitudinal side of the truck body, the arms controllable to pick up the outside container and sequential dump the bin contents into a set of matching truck body bins.

These and other objects and advantages of my invention will become apparent from the following detailed description when read in conjunction with the drawings.

DETAILED DESCRIPTION OF THE PREFERRED EMBODIMENT

Figure 1:
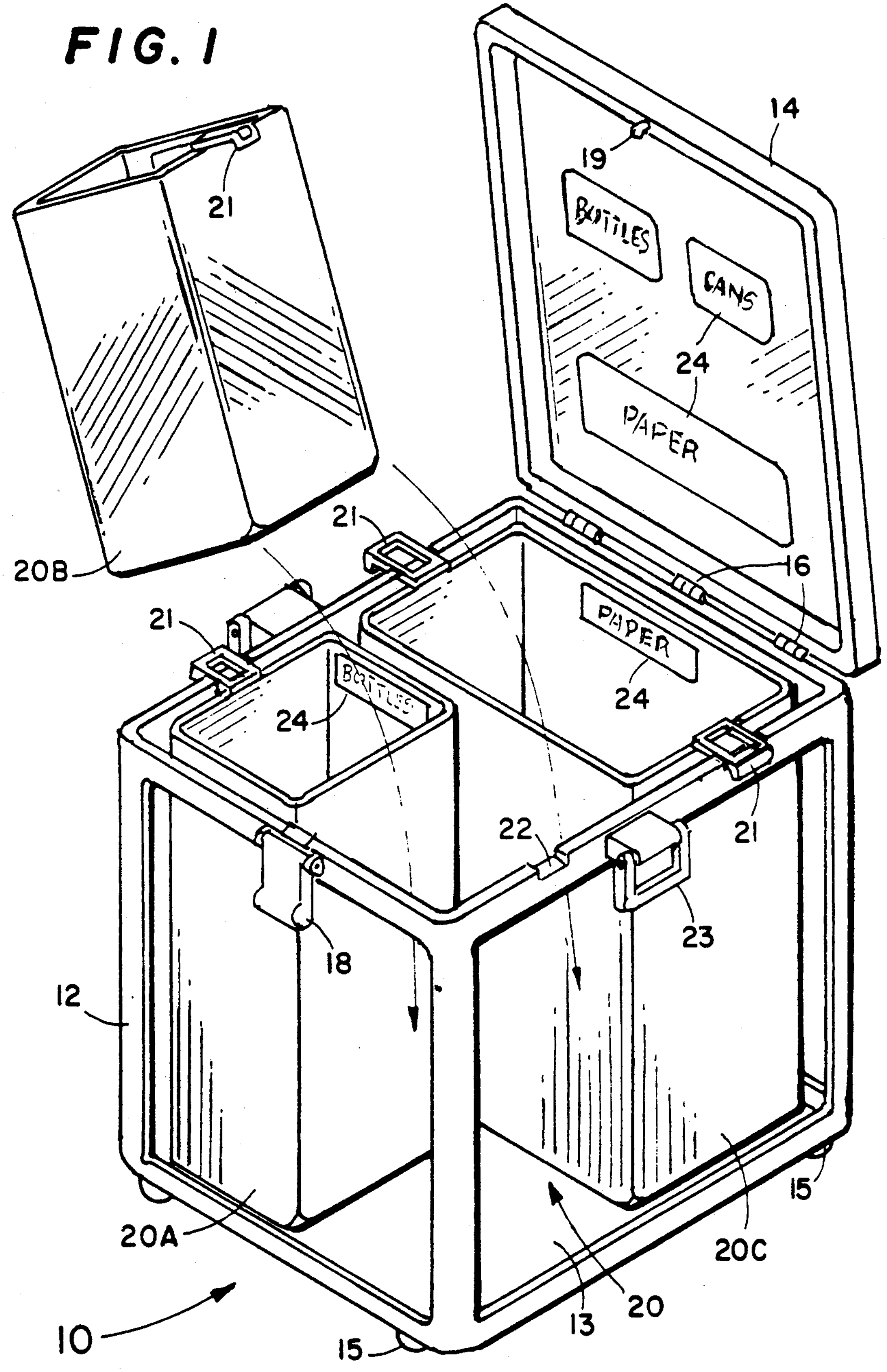
FIG. 1 is a perspective view of the trash collecting bins of my invention for use inside a building.
Figure 2:
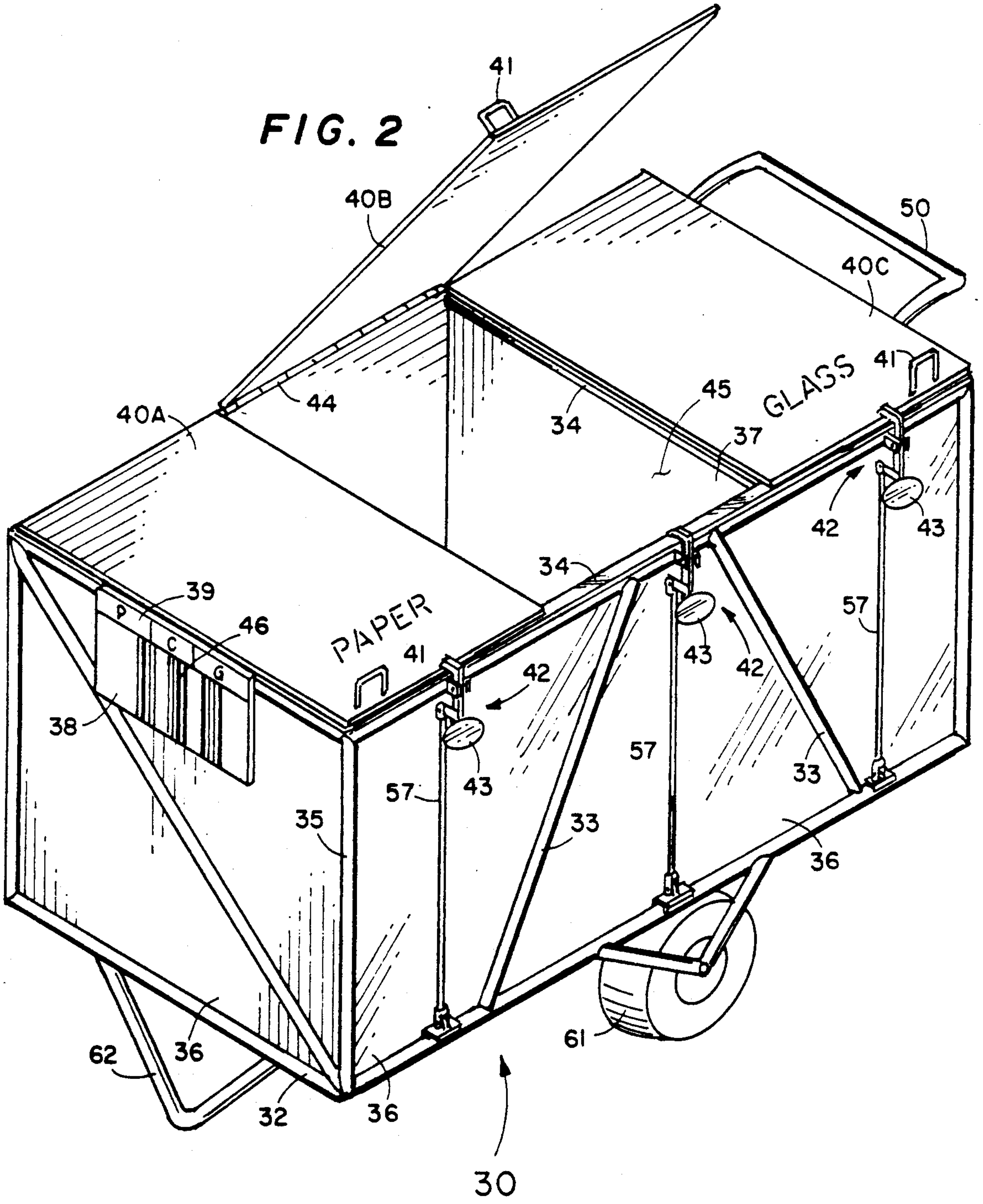
FIG. 2 is a perspective view of the trash collection container assembly for use outside of a building and at curbside.
Figure 3:
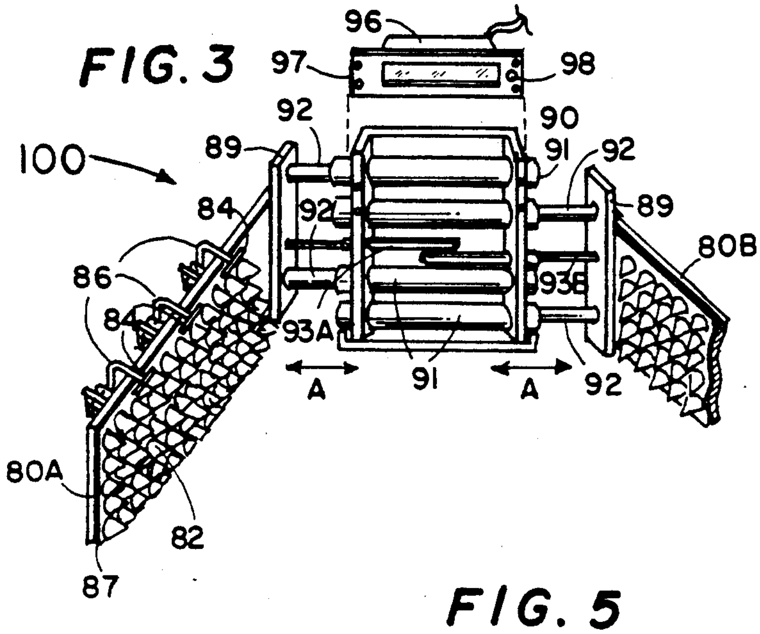
FIG. 3 is a partial perspective view of a pickup arm assembly of my invention for use with the outside containers assembly of FIG. 2.

The separated trash pickup system of my invention includes three major assemblies: a set of point-of-use trash collection bins to be described with reference to FIG. 1; an outside or curbside trash container to which trash collected in the point-of-use bins of FIG. 1 is transferred in combination with a pair of container pickup arms as shown in FIGS. 2 and 3; and a truck body assembly for picking up the curbside container of FIG. 2 and selectively dumping the trash contained therein into corresponding bins by means of a computerized control subsystem, shown in FIGS. 7 and 8.

POINT OF USE CONTAINERS

Referring now to FIG. 1, an outer container 10 which may be formed as a framework 12 having a cover or lid 14 attached thereto by hinges 16. Hinges 16 may include spring loading to bias cover 14 to the open position. Framework 12 may be formed from a strong plastic material or metal. Alternatively, container 10 may be formed as closed sides container from sheet material. A catch 19 on cover 14 locks cover 14 when closed and a catch release 18, when depressed, releases cover 14. When a spring-loaded lid is used, a foot pedal type release may be substituted for opening lid 14.

A plurality of trash bins 20 is inserted into outer container 10. For purposes of explanation, three such inner bins 20A, 20B and 20C are shown. Preferably, such bins are formed from a suitable lightweight plastic. Inner bins 20 may be selected to mate together to make maximum use of the space in outer container 10. Handles 21 permit a bin 20 to be lifted from outer container 20.

Labels 24 may be placed on the inner surface of the cover 14 and each bin 20 to indicate the type of separated trash for each bin. For example, bin 20B is shown removed from outer container 10 and is labeled for cans, and bin 20C is labeled for paper. Thus, labels 24 on the cover 14 and on each bin 20 permit identification of the use thereof whether in or out of the outer container. Other means of identification may be used such as having bins 20 of differing colors according to the type of trash to be deposited therein. Frame 12 is cut away along the top edges to accommodate the handles 21, permitting cover 14 to be flush when closed. If desired, casters 15 may be placed on the bottom surface 13 of outer container 10 for easy movement. In use, outer container 10 would be positioned in a kitchen or, like facility, at a point for which it would be convenient to separate and dispose of the specified materials.

CURBSIDE CONTAINER AND PICKUP ARM ASSEMBLY

FIG. 2 illustrates a container to be normally stationed outside of a building and adapted to be moved to curbside for trash pickup. Outside container 30 preferably utilizes a tubular metal framework 32 having essentially rectangular sides. As will be explained below, the framework provides a means for gripping of the container 30 for lifting and dumping. Framework 32 is covered on the inner faces thereof by panels 36 which may be of sheet metal, or sheet plastic. Alternatively, the entire container 30 may be molded from plastic having ribs on the external surface thereof to provide strength and gripping surfaces. A plurality of dividers 37 is provided to provide the container 30 into a plurality of bins 45. Three bins 45 are shown to match the number of bins shown in FIG. 1 for indoor container 10 although it is to be understood that the system of the invention may utilize more or less than three bins. Each bin 45 includes a hinged lid 40; for example, lid 40B shown in an open position. Each lid 40 is hinged along one edge by hinge 44. Handles 41 are provided for manual opening of lid 40. Although I have shown lids 40 hinged along a longitudinal edge of container 30, the lids may be hinged laterally. A metal channel 34 may attached around the top periphery of tubular framework 32 and divider 37 to provide a flat mating surface for lids 40.

As will be shown in more detail hereinafter, it is necessary for lids 40 to be maintained in the closed position prior to dumping of the contents of each bin 45. To this end, a spring loaded catch 42 is provided for each bin 45. An operating rod 57 for each lock extends from catch 42 to a pivot bracket 60 attached to a lower element of pipeframe 32. A push plate 43 is attached to each catch 42 to permit manual release thereof.

To permit outside container 30 to be easily moved, a pair of wheels 61 is mounted midway of container 30 with a stand 62 at the other end to maintain container 30 level. A handle 50 is provided for moving container 30. The size of container 30, as well as the individual bins 45, may be selected in accordance with the expected volume of trash, frequency of collection, and relative amounts of separated trash. If the weight and size requires, casters may be substituted for stand 62 for ease of handling of outside container 30.

The outside container 30 is designed in conjunction with a pair of container clamping arms 80A and 80B as shown in FIG. 3. A frame 90 supports a set of cylinders 91 and a set of rods 92 are telescopically inserted into cylinders 91. Clamping arm mounting plates 89 are attached to the respective ends of rods 92. A hydraulic linear actuator 93A is mounted on frame 91 and connected to mounting plate 89 of clamping arm 80A while linear actuator 93B is attached to mounting plate 89 of clamping arm 80B. As will be understood, simultaneous operation of actuators 93A and 93B will cause clamping arms 80A and 80B to move inwardly or outwardly, as indicated by arrows A, in accordance with the direction of movement of actuators 93. A panel 97 mounts a bar code reader head 96 with the assembly shown in exploded view, normally mounted at the upper end of frame 90 as will be shown in more detail hereinafter. The inner surfaces of clamping arms 80A and 80B are covered with a resilient pad 87, each preferably having a plurality of resilient conical projections 82, and arranged in orthogonally related rows and columns disposed parallel to the longitudinal edges of arms 80A and 80B. Pad 87 may be formed from urethane, rubber, or the like. Additional details of pads 87 may be found in my U.S. Pat. No. 4,175,903. Clamping arm 80A includes a plurality of catch actuators 86. Each actuator has a short, horizontal bar 84 at its distal end as will be described in more detail below.

Outside container 30 includes a bin identification plate 38 attached to one end thereof. The arrangement and contents of each bin may be indicated as at indicia 39 by appropriate legends. Additionally, a set of bar codes 41 is provided on plate 38.

Figure 5:
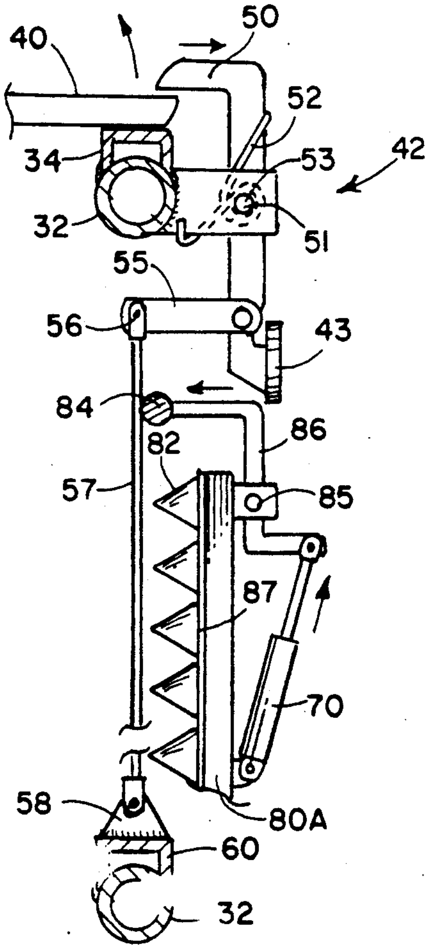
FIG. 5 shows a partial cross-sectional view of the framework of the container assembly of FIG. 2 and an end view of a pickup arm of FIG. 3 showing a lid release mechanism.
Figure 6:
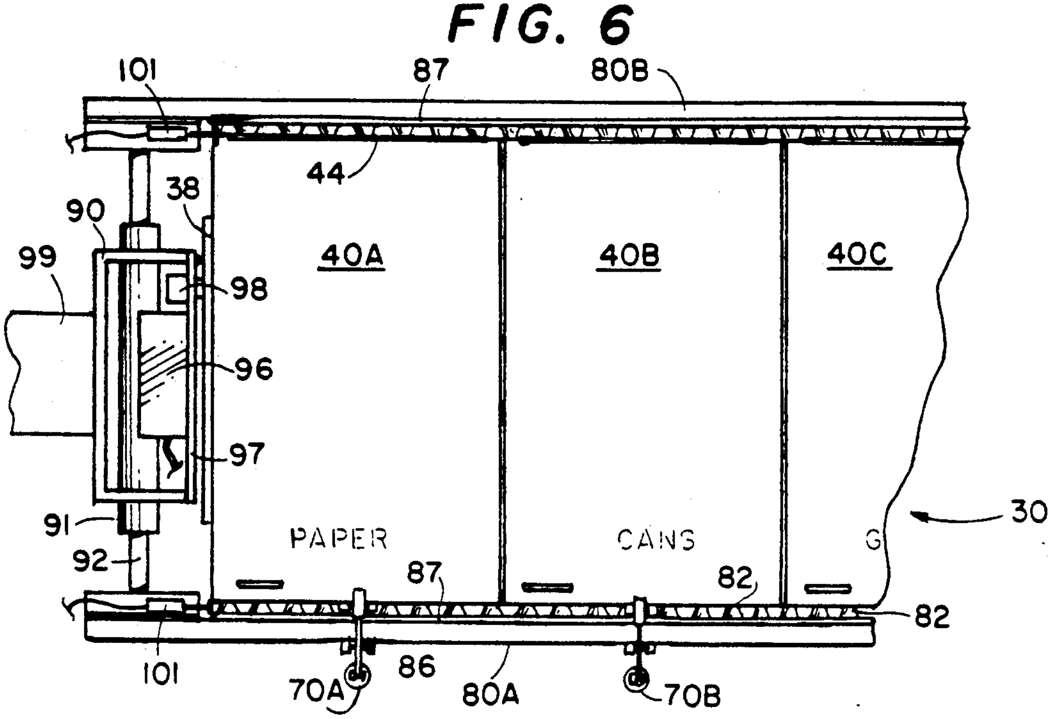
FIG. 6 is a partial top view of the container assembly of FIG. 2 and the pickup arm assembly of FIG. 3 in place preparatory to picking up the container assembly.

Turning now to FIGS. 5 and 6, the operation of the clamping arm assembly 100 of FIG. 3 in combination with outside container 30 will be described. When a container 30 is to be picked up, the clamping arms 80A and 80B of assembly 100 are spread apart by operation of actuators 93. The arms 80 and assembly 100 are then moved forward along the sides of container 30 having identification plate 38 attached thereto. When bar code reader mounting assembly 97 contacts plate 38, a limit switch 98 will close causing the forward movement of assembly 100 to cease. As may be noted, bar code reader 96 will be opposite bar codes 41. A control system to be described in more detail hereinbelow will identify the materials in each of bins 45 of container 30.

Figure 4:
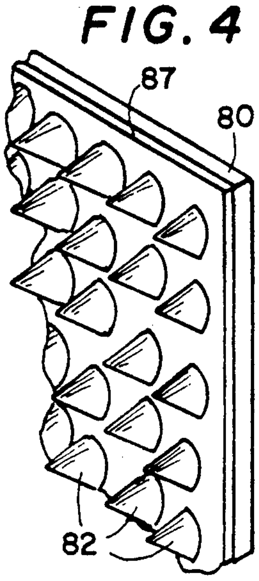
FIG. 4 is a partial view of a pickup arm of the assembly of FIG. 3 showing resilient cones attached thereto.

The control system will then operate actuators 93 to close, moving arms 80A and 80B inwardly until contact is made with framework 32 of container 30. Limit switches 101 indicate when clamping pad 87 (best seen in FIG. 4) closes against tubular frame 32, vertical members 33, seen in FIG. 2, will be securely clamped between the resilient cones. Alignment is not critical since the cones 82 will deform as the tubular members 33 are gripped. As will be noted from FIG. 2, tubular braces 33 are set at an angle with respect to vertical corner elements 35. Thus, angular members 33, which will prevent vertical slipping of container 30 when clamped between arms 80A and 80B. Bin indicator plate 38 may be made to extend downward as far as necessary such that it can be read by bar code reader 96, irrespective of the exact vertical positioning of arms 80.

To be able to dump the contents of each bin 45 of container 30, lids 40 must be released at the proper time. FIG. 5 illustrates the operation of the lid catch release system. As previously mentioned, lid 40 is held against channel member 34 by lock arm 50 which is spring loaded by means of spring 52 or similar biasing device. Arm 50 is pivoted to upper longitudinal frame member of frame 32 by bracket 51 and pivot pin 53. Rod 57 is connected to the lower end of lock arm 50 by clevis 56, link 55, and pivot 54. Rod 57 is pivoted at its lower end by clevis pin 58 attached to bracket 60. Clamping arm 80A includes a linear actuator 70 attached to an outer surface thereof for each bin 45. A crank arm 86 is pivoted by pivot 85 at the upper edge of the back surface of clamping arm 80A and includes a short horizontal bar 84 attached to the distal end thereof as previously mentioned. With actuator 70 in the non-operated position, bar 84 is in contact with rod 57. When the lid 40 is to be opened for dumping, actuator 17 is operated forcing bar 84 against rod 57 releasing lock arm 50. As will be recognized, dumping occurs when container 30 is inverted and release of lid 40 will cause lid 40 to open by gravity.

COLLECTION TRUCK BODY AND DUMPING ARM OPERATION

Figure 7:
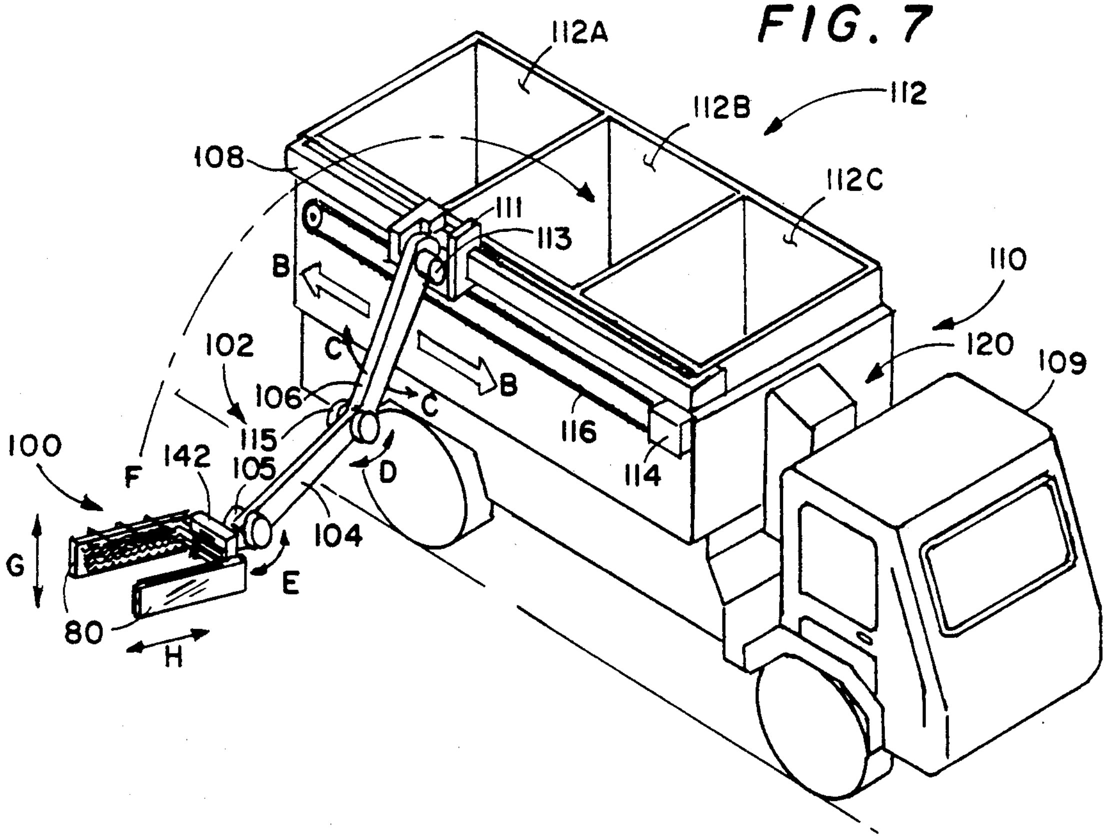
FIG. 7 is a perspective view of a collection truck in accordance with my invention having a controllable articulated arm assembly attached to the container pickup arms of FIG. 3.

Referring now to FIG. 7, a truck 109 is shown having a trash collecting body 110 mounted thereon. Body 110 includes a plurality of bins 112. In this example, three bins 112A, 112B, and 112C are indicated to match the number of outside container bins 45. A pickup arm assembly 102 comprises an inner arm 106 and an outer arm 104 connected by rotary elbow joint 115. A rotary joint 105 at the distal end of outer arm 104 connects to frame 90 of clamping arm assembly 100 via bracket 99. The proximal end of pickup arm 102 is attached to a carriage 111 by rotary joint 113. Carriage 111 is mounted to track 108 which extends the length of the truck body 110. A chain drive 116 operated by hydraulic motor 114 is connected to carriage 111 and serves to move carriage 111 the length of truck body 110 as indicated by arrows B. Although a chain drive is shown, other drives such as cable, lead screw, gear drive, and the like are equally suitable. Rotary joints 105, 115, and 113 are preferably hydraulic actuator assemblies, for example as shown in U.S. Pat. No. 3,713,554 and available from Buffalo Hydraulics division of Houdaille Industries, Inc.

The rotary actuators are operated by hydraulic lines which have been omitted for clarity. Inner arm 106 is movable in a vertical plane as indicated by arrows C by actuator 113, and arm 104 moves in a vertical plane by action of rotary actuator 115 as indicated by arrows D. Similarly, clamping arm assembly 100 is controlled by rotary actuators 105 which rotates as indicated by arrows E. During the engagement and initial lifting of container 30 by pickup arm assembly 102, the actuators are controlled to maintain clamping arms 80 parallel with the ground as indicated by arrows G and horizontally by arrows H, by proper coordination of the operation of the rotary actuators 105, 113, and 111.

As will be understood, when a curbside container 30 is to be picked up and dumped, clamping arm assembly 100 is extended to be close to the ground surface and generally in the orientation as indicated in FIG. 7. The arm actuators are operated to move clamping arms 80 to engage and clamp the curbside container 30 to be dumped. At that point, the rotary actuators are operated to cause clamping arm assembly 100 to move generally as indicated by arrow F. Assuming that the container 30 is to be dumped in bin 112B as shown in the example, arms 106 and 104 are operated to pick up container 30, and to invert the same. When the inverted container is over bin 112B, the appropriate catch release actuator is actuated, causing the lid 40B of the container 30 to open by gravity thereby dumping the contents. With the container elevated sufficiently so that the lids will clear the partitions, carriage 111 is then moved to the next bin and the operation repeated for the desired bin 45.

After all bins are dumped, the arm assembly 102 is extended to place the empty container 30 back in its position on the ground. After releasing of the pickup arms, arms 104 and 106 are folded over or against the truck body 110 with the clamping arms for transport to the next pickup point.

Figure 8:
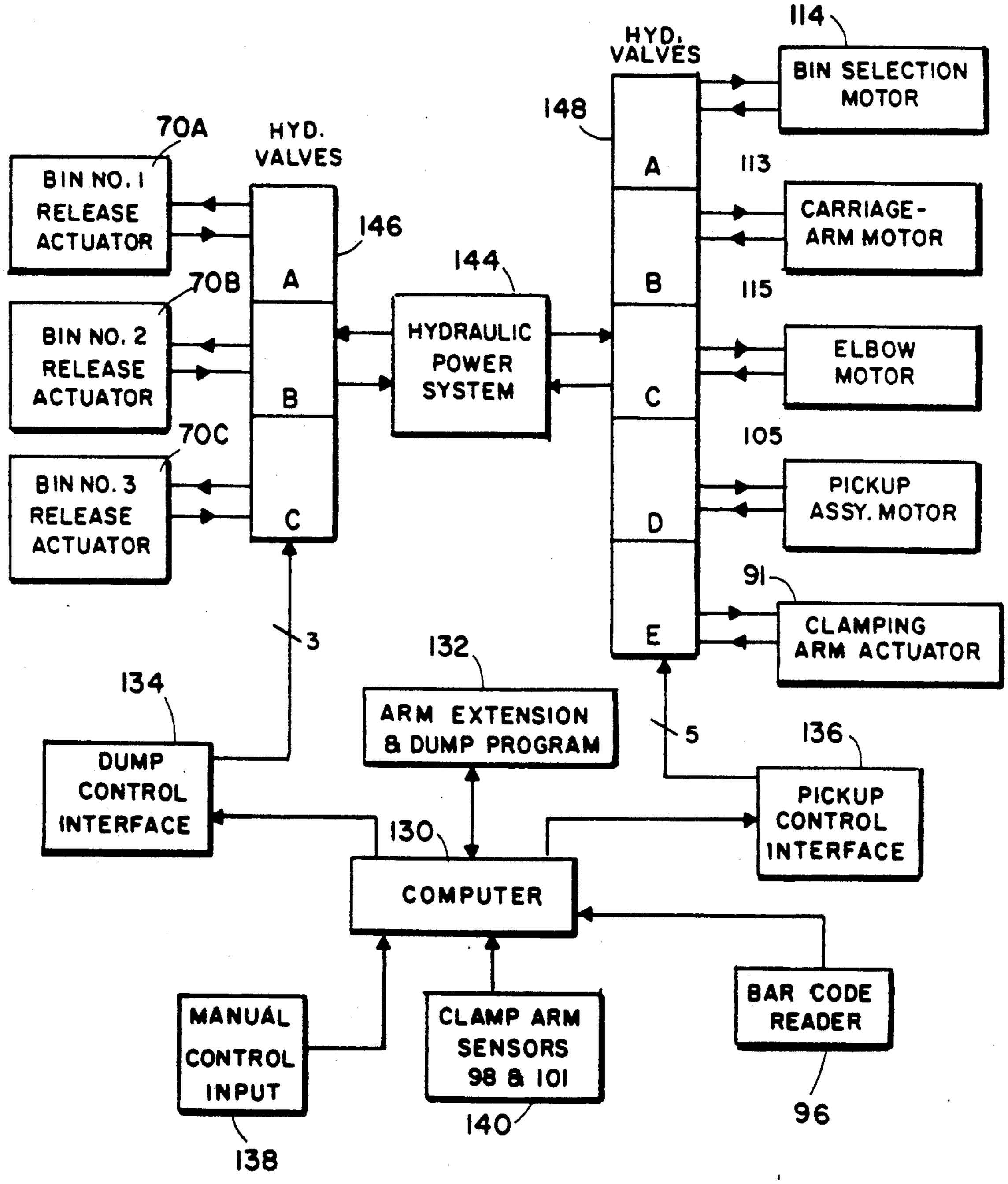
FIG. 8 is a block diagram of a computerized control system for my trash pickup system.

The control system for my invention is shown in block diagram form in FIG. 8. Truck 109 includes hydraulic power system 144 which drives the various hydraulic actuators and motors via electrically operated hydraulic valves 146 and 148. A computer 130 is programmed by an arm extension and dump program 132. In addition, manual control input 138 is provided which can override the program 132 in emergencies or in a non-standard situation. Manual control input 138 is also used by the operator of the truck to initiate a sequence of pickup and dump operations.

Figure 9:
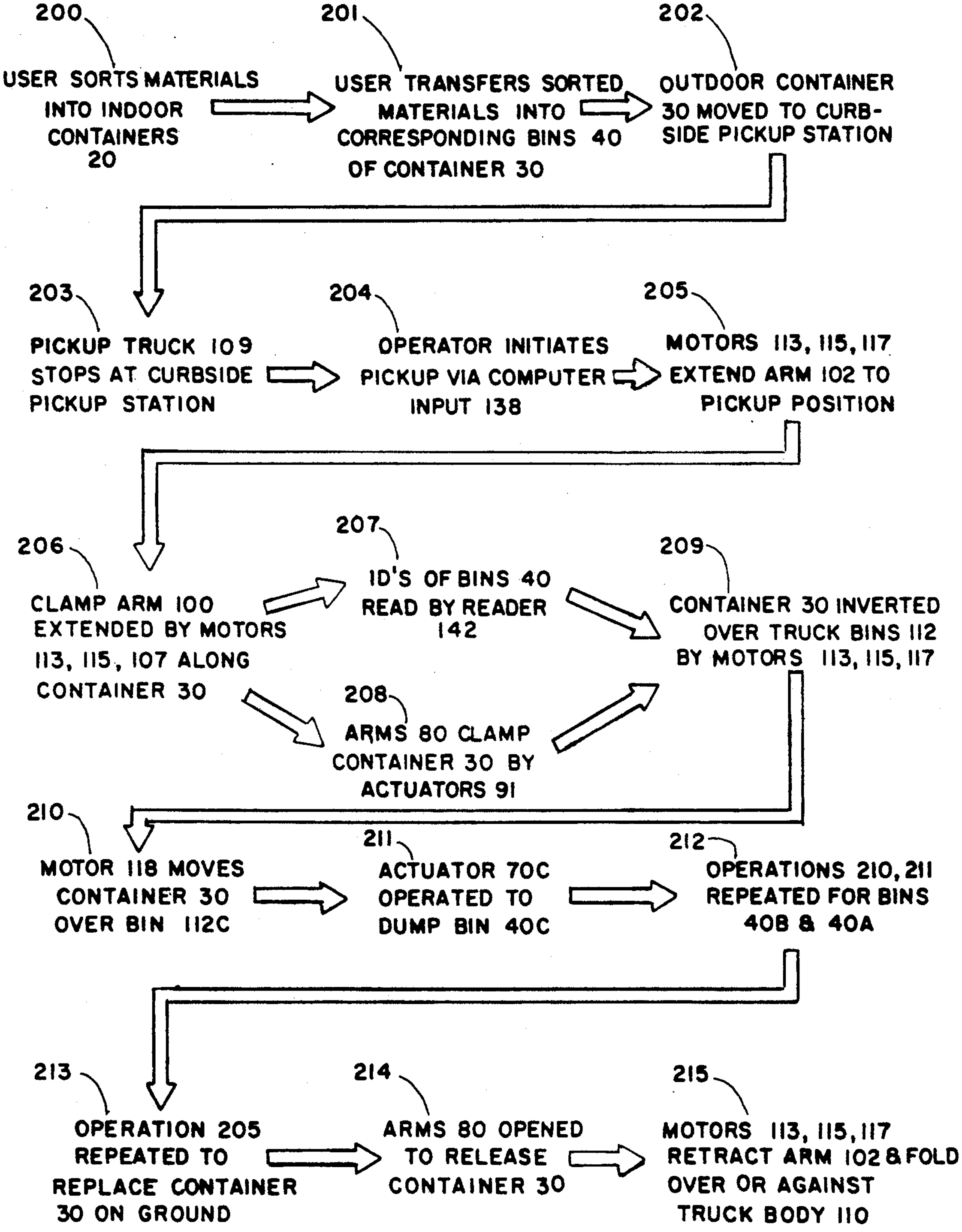
FIG. 9 is a flow diagram of the operation of my mechanized trash pickup system.

Having described the system of my invention, a typical sequence of events and operations will be described with reference to FIGS. 8 and 9. In step 200, a user sorts materials into indoor bins 20. At a convenient time, step 201 is performed which transfers the sorted materials into the corresponding bins 40 of outdoor container 30. When the material in the outdoor container 30 is to be collected, the container is moved to a curbside pickup station in step 202. In step 203, pickup truck 109 of FIG. 7 stops at curbside, adjacent container 30. The truck operator initiates the pickup sequence via computer input 138 in step 204. Step 205 includes automatic operation of motors 113, 115, and 105 in accordance with the program 132 to unfold arm 102 and clamping arm assembly 100 and to extend clamping arm assembly 100 to a horizontal position adjacent container 30. Next, in step 206, program 132 directs computer 130 to extend clamping arms 100 horizontally by means of motors 113, 115, and 105 along the sides of container 30. When bar code reader 142 contacts the end of container 30, extension of clamping arm assembly 100 stops, and the identification of each bin 40 of container 30 is read into computer 130. Simultaneously, step 208 is accomplished in which arms 80 are moved together by actuators 91 to clamp container 30. In step 209, container 30 is picked up by operation of motors 113, 115, and 105 and inverted over truck bins 112.

Preferably, pick up of a container 30 is initiated with carriage 111 at its most forward position such that the operator may visually monitor the operation from the truck cab. It is to be understood that the operator may move pickup arm assembly 100 by manual control input 138 when necessary to align the clamping arms 100 with the container 30 to be picked up. When container 30 is inverted over truck bins 112, the computer will control motor 114 to move the inverted container 30 over a selected bin 112. For example, it is preferred to initially move container 30 over the foremost bin 112C, as indicated in step 210. Program 132 identifies the contents of bin 112C from the output from bar code reader 96 and operates actuator 70C to release the lid 40C and dump the contents of bin 40C into bin 112C. It may be noted that it is not necessary for there to be correspondence between like-numbered bins in container 30 and in truck bins 112. Steps 210 and 211 are repeated moving container 30 sequentially to bins 112B and 112A, releasing the respective contents thereof into those bins as directed by program 132.

After dumping of all bins, operation 205 is repeated which extends clamping arms 100 parallel to the ground to the original pickup position. In step 214, arms 80 are opened to release container 30. The last step 215 operates motors 113, 115, and 105 to retract arm 102 and fold arms 104, 106, and clamping arms 110 over or against bin 112C of truck body 110. Truck 109 may then continue on its pickup route.

Although I have described my separated trash collection system with reference to a truck 109 having body 110 attached thereto, it is within the scope of my invention to provide a collection bin 110 adapted to be removed from a truck at a site, such as an apartment or industrial complex, and subsequently picked up for transport to a material reclamation center. Hydraulic power system 144 of FIG. 8 would include use of electric power from electric utility lines for operating hydraulic pumps while at the site. An occupant of the complex moves his outside container 30, when full, to the body 110. The container 30 moved to a designated area, and an operate control button on manual control input 138 is pressed. From that point, the pickup and dump procedure is automatic, as described above. The system returns container 30 to the ground to permit the occupant to move it back to his apartment or place of business.

As will now be recognized, I have disclosed an integrated, automated trash pickup system for assorted materials. The elements of the invention have been shown in exemplary form; however, I am not to be limited to the specific arrangements as many variations can be made therefrom without departing from the spirit and scope of my invention. For example, container 30 has been shown with equal size bins aligned horizontally. More or less number of bins may be used of varying sizes, and bins divider sections may be longitudinal as well as lateral. Thus, almost any reasonable number of bins may be provided. Therefore, I am to be limited only by the appended claims.

I claim:

1. A system for collection, separation, and picking up of recyclable materials comprising:

(a) first container means for stationing at a point of use, and having a plurality of removable first bins, each of said first bins for receiving a different type of materials;

(b) second container means for stationing at a pickup point, and having a plurality of second bins corresponding to at least the number of said first bins, said second container means for selectively receiving materials being transferred from said first bins;

(c) a bin lid hingedly attached to each of said second bins, each lid including latch means for maintaining said lid in a closed condition;

(d) a pickup arm assembly having means for engaging said second container means preparatory to lifting of said second container means;

(e) a truck body for mounting to a truck, said body having a plurality of third bins corresponding to at least the number of said second bins;

(f) a track attached to said truck body for supporting said pickup arm assembly, including carriage means for moving said assembly along said body;

(g) said pickup arm assembly including articulated pickup arms attached between said container engaging means and said carriage means, first actuator means for moving said articulated arms vertically and laterally with respect to said truck body, second actuator means for moving said container engaging means, and third actuator means for selectively releasing said lid latch means; and (h) control means for controlling said first, second, and third actuator means to engage said second container means, to lift and invert said second container means over said truck body, to selectively operate said carriage means to move the inverted second container means over each of said third bins, and to selectively release each of said closed lids over one of said third bins corresponding to the type of material in each of said closed second bins causing said material to drop from each selected second bin into a corresponding third bin.

2. The system as defined in claim 1 in which said container engaging means includes a pair of clamping arms mounted to said assembly and adapted to move toward and away from each other, said clamping arms movable to clamp said second container means therebetween preparatory to the lifting of said second container means.

3. The system as defined in claim 2 in which said control means includes:

machine readable indicia attached to said second container means, said indicia indicative of the type of material to be deposited in each of said second bins;

indicia reading means attached to said pickup arm assembly for reading said indicia; and said control means also for selectively releasing each of said lids in accordance with said indicia.

4. The system as defined in claim 3 in which said control means includes:

a computer;

a computer program for said computer, said program causing said pickup arm assembly to perform movements necessary to clamp said second container means, to pick up and invert said second container means, to selectively move said second container means to each of said third bins, and to selectively release each of said lids;

a manual control input for permitting operator intervention and control of said pickup arm assembly and said carriage.

5. The system as defined in claim 4 in which said computer program further causes said pickup arm assembly to return said second container means to said pickup point, and to operate said clamping arms to release said second container means, and to thereafter fold said clamping arm assembly adjacent said truck body.

6. The system as defined in claim 3 in which said machine readable indicia is a barcode.

7. An automated trash collection system for recyclable materials comprising:

(a) a point-of-use outer container having (i) a plurality of first bins fitted within said outer container, each of said first bins marked for receiving a different material than other ones of said first bins, and (ii) means for selectively removing desired ones of said first bins;

(b) a second outdoor container, transportable to a pickup location having:

(i) a plurality of second bins corresponding to at least the number of said first bins and marked to selectively receive materials from said first bins, (ii) a lid hingedly attached to each of said second bins, (iii) latch means attached to said second container for maintaining each of said lids in a closed condition, and (iv) a machine readable barcode disposed on an outer surface of said second container;

(c) a truck body for mounting to a truck having (i) a horizontally disposed track attached to a longitudinal side of said truck body, (ii) a carriage mounted to said track, including means for moving said carriage along said track, (iii) a pickup arm assembly having articulated arms with a proximal end thereof attached to and extending at essentially right angles from said carriage, said pickup arm assembly including means for moving said articulated arms vertically and laterally with respect to said truck body;

(d) a clamping arm assembly attached to a distal end of said articulated arms and extending in the plane of said articulated arms, said clamping arm assembly including (i) a pair of opposed clamping arms with opposing inner surfaces, (ii) means for moving said clamping arms alternately toward and away from each other, (iii) means mounted on said clamping arms for selectively releasing said lid latch means;

(e) computer means including (i) a computer program installed in said computer, said program causing said pickup arm assembly to move said clamping arm assembly to a position to clamp said second container between said clamping arms, to pick up and invert said second container, to selectively move said carriage to place said second container over each of said third bins, and to selectively operate each of said latch release means, and (ii) manual control input for permitting operator intervention and control of said pickup arm assembly and said carriage.

8. The system as defined in claim 7 in which opposing inner surfaces of said clamping arms each have a resilient pad attached thereto.

9. The system as defined in claim 7 which further includes a barcode reader mounted on said clamping arm assembly and connected to said computer for reading and identifying the contents of each of said second bins.

10. The system as defined in claim 7 which said computer program further causes said carriage and said pickup arm assembly to replace said second container at said pickup location.

* * * * *